US011392622B2

(12) United States Patent
Shivashankara et al.

(10) Patent No.: US 11,392,622 B2
(45) Date of Patent: Jul. 19, 2022

(54) CLOUD SERVICE CATEGORIZATION

(71) Applicant: Hewlett Packard Enterprise Development LP, Houston, TX (US)

(72) Inventors: Lokesh Shivashankara, Bangalore Karnataka (IN); Vikas Dhananjaya Murthy, Bangalore Karnataka (IN); Shrinath Vasudevamurthy Honnavalli, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 51 days.

(21) Appl. No.: 16/459,809

(22) Filed: Jul. 2, 2019

(65) Prior Publication Data
US 2021/0004389 A1 Jan. 7, 2021

(51) Int. Cl.
| G06F 16/13 | (2019.01) |
| G06F 16/28 | (2019.01) |
| H04L 67/10 | (2022.01) |
| G06F 16/383 | (2019.01) |
| G06F 16/35 | (2019.01) |
| G06F 16/20 | (2019.01) |
| G06F 40/20 | (2020.01) |

(52) U.S. Cl.
CPC ............ G06F 16/285 (2019.01); G06F 16/20 (2019.01); G06F 16/35 (2019.01); G06F 16/383 (2019.01); G06F 40/20 (2020.01); H04L 67/10 (2013.01)

(58) Field of Classification Search
CPC .................................. H04L 67/02; H04L 67/10
See application file for complete search history.

(56) References Cited

U.S. PATENT DOCUMENTS

| 9,568,909 B2 | 2/2017 | Lawson et al. |
| 2015/0244597 A1 | 8/2015 | Maes et al. |
| 2015/0373012 A1 | 12/2015 | Bartz et al. |
| 2017/0171024 A1 | 6/2017 | Anerousis et al. |
| 2020/0174966 A1* | 6/2020 | Szczepanik ............ G06F 16/116 |
| 2020/0387357 A1* | 12/2020 | Matron ................. G06F 9/5077 |

OTHER PUBLICATIONS

Greg Hintermeister, "Hybrid Enhancements Across IBM Cloud Private and IBM Cloud", Cloud Engagement Hub, Jun. 30, 2018, 16 pages.
HPE, "HPE OneSphere: Your hybrid cloud manager is here", Technical White Paper, Rev. 4, Nov. 2018, 34 pages.

* cited by examiner

Primary Examiner — Yves Dalencourt
(74) Attorney, Agent, or Firm — Jaffery Watson Mendonsa & Hamilton

(57) ABSTRACT

Example techniques of cloud service categorization are described. In an example, presence of a keyword, in metadata of an item, amongst a plurality of items, is determined. Each of the items is representative of a corresponding service hosted by a cloud network in a cloud infrastructure. The metadata is indicative of functional characteristics of a service represented by the item. Based on the keyword and a predefined mapping, the item is grouped in a category, amongst a plurality of categories. The predefined mapping is indicative of a correlation between the plurality of keywords and the plurality of categories. A list of the plurality of categories may be generated, where each of the plurality of items is grouped in a respective category amongst the plurality of categories.

20 Claims, 5 Drawing Sheets

System 100

Processor(s) 102

Memory 104

[[Analyze metadata of an item, amongst a plurality of items, each of the plurality of items being representative of a corresponding service hosted by a cloud network in a cloud infrastructure, the metadata being indicative of functional characteristics of a service represented by the item;

Determine, based on the analysis, presence of a keyword, amongst a plurality of keywords, in the metadata of the item;

Group, based on the keyword and a predefined mapping, the item in a category, amongst a plurality of categories, wherein the predefined mapping is indicative of a correlation between the plurality of keywords and the plurality of categories; and Generate a list of the plurality of categories, wherein each of the plurality of items is grouped in a respective category amongst the plurality of categories ]]

Fig. 1

CLOUD SERVICE CATEGORIZATION

BACKGROUND

A cloud network enables communication between components in a cloud computing infrastructure and external users, applications, or services. Resources and operations of the cloud network are facilitated by the cloud computing infrastructure. A cloud network can enable connection between a remote user and a cloud application (Software as a Service) or a remote user and a cloud infrastructure (Infrastructure as a Service). Cloud service provides offer services and applications to the users. The applications and services offered by the cloud service providers may enable deployment and management of computing resources of the cloud networks.

Multiple cloud networks and storage resources may be grouped in a single heterogeneous architecture referred to as a cloud infrastructure. The cloud infrastructure refers to hardware and software components such as servers, storage, a network and virtualization software that are needed to support computing requirements of a cloud computing framework. In the cloud infrastructure, cloud assets, software, applications, etc., may be distributed across several cloud networks. The cloud infrastructure may include cloud networks or cloud hosting environments provided by different cloud service providers. In the cloud infrastructure, the cloud networks may be managed by a multi-could management platform. The multi-cloud management platform includes hardware, software, firmware, or a combination thereof which provides a unified interface for deployment, provisioning, and monitoring of different cloud networks in the cloud infrastructure.

BRIEF DESCRIPTION OF DRAWINGS

The following detailed description references the drawings, wherein:

FIG. 1 illustrates a system for grouping items representative of cloud-based services into categories, according to an example;

DETAILED DESCRIPTION

Figure 2:
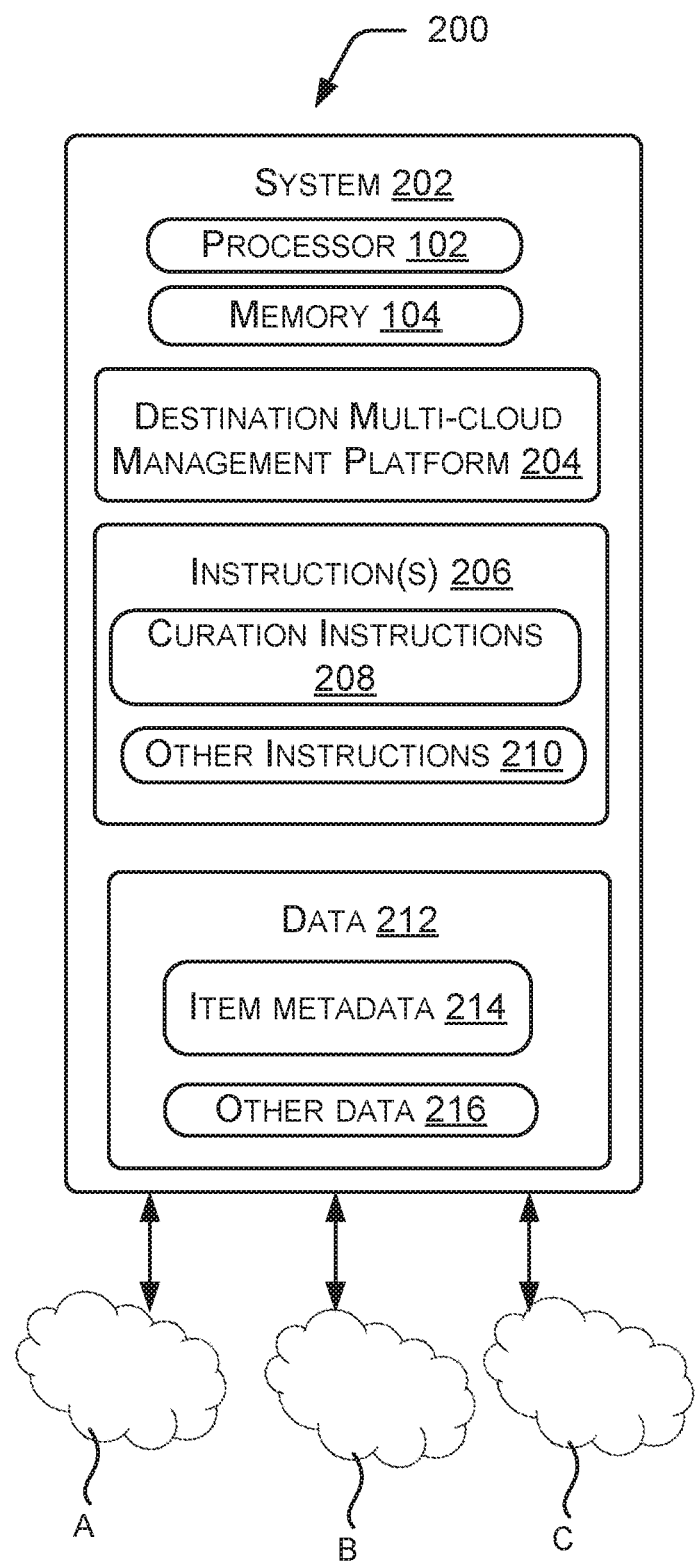
FIG. 2 illustrates a cloud infrastructure according to an example.

In a cloud infrastructure, cloud service providers hosting different cloud networks may offer services for carrying out various functions related to cloud orchestration, deployment, scaling, and management of computing resources in the cloud infrastructure. The services offered by multiple cloud service providers may be represented as a list of items in a unified interface provided by the multi-cloud management platform.

For example, a hybrid cloud infrastructure may include cloud networks hosted by public cloud service providers and private cloud service providers. Each of the public and private cloud service providers may offer virtual appliances, also called images, resource management templates, databases, helm charts, microservices, containers, etc., for deployment and management of computing resources of the hybrid cloud infrastructure.

The virtual appliances may be used to create virtual machine(s) within the cloud network(s). Resource management templates, also referred to as templates, define components of the cloud infrastructure, for example, a database server, a network address, a storage volume, etc., for deployment of the computing entities and may be used for cloud orchestration. Templates allow simpler deployment, convenient replication, and simpler management of the computing entities in the cloud computing platform. A container has operating system (OS)-like capabilities to execute an application. Thus, the container may include system tools, system libraries, OS filesystems, etc. The container may be associated with an isolated user-space in which computer programs/applications run directly on a kernel of an OS of the computing resource and has access to a predefined subset of resources of the OS and a designated portion of a memory of the computing resource. A microservice is an application structured as a suite of services, each running in its own process and communicating with lightweight resources, such as an Hyper Text Transfer Protocol (HTTP) resource Application Programming Interface (API). Microservices are independently deployable. A helm chart is a collection of files that describes a related set of Kubernetes resources. Helm charts may be used to deploy a web app stack with HTTP servers, databases, caches, and so on.

The images, templates, databases, helm charts, containers, and microservices, may be represented by items having a name and a symbol. the name and symbol of the item may be indicative of the service represented by the item. Each item is representative of a corresponding service hosted by a cloud network in the cloud infrastructure. As the number of cloud networks managed by the multi-cloud management platform increases, the services provided by the cloud service providers of the cloud networks also increases. Thus, the items representing the services in the list also increases. Thus, when multiple cloud networks hosted by different cloud service providers are on boarded in the hybrid cloud infrastructure, a number of items are provided to a cloud administrator (admin) for deployment, provisioning, monitoring, and orchestration of the cloud networks.

The admin, generally goes through multiple lists of the items from a variety of repositories of each public/private cloud service providers. Thus, the admin manually curates the items before providing it to the cloud content consumers also called cloud users. As there are a variety of items provided in multiple lists, manual curation of the lists may be time consuming and cumbersome.

The present disclosure describes approaches in which, items representative of services hosted by cloud service providers in the cloud infrastructure, are categorized without manual effort. The items grouped in categories allows users to browse through the items swiftly and conveniently. The present disclosure relates to grouping the items in categories based on metadata of the items. The metadata is indicative of functional characteristics of a service represented by the item. Thus, the present disclosure enables functional grouping of the items. The metadata of the item may be predefined a cloud service provider which offers the service represented by the item. According to the present disclosure, presence of a keyword in metadata of an item is determined. The keyword may be a phrase or a set of words. Each of the plurality of items is representative of a corresponding service hosted by a cloud network in a cloud infrastructure. The item is grouped in a category, amongst a plurality of categories, based on the keyword and a predefined mapping. The predefined mapping is indicative of a correlation between the plurality of keywords and the plurality of categories. A list of the plurality of categories is generated, where each of the plurality of items is grouped in a respective category amongst the plurality of categories.

Thus, the items grouped in the categories provide a curated list of the items representative of services in different categories. Using the curated list of items, a network admin can swiftly and conveniently provide access to the services to the cloud users. The admin may present the curated list to a cloud user who can select the item and consequently access the corresponding service based on the category under which the item is grouped.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a system 100 for grouping items representative of cloud-based services into categories, according to an example. The system 100 may be an electronic device, such as a desktop, a laptop, a tablet, a handheld device, etc., capable of processing computer readable instructions. In an example, the system 100 may be a computer running a multi-cloud management platform in a hybrid cloud infrastructure.

The system 100 includes a processor 102 and a memory 104 coupled to the processor 102. The memory 104 stores instructions executable by the processor 102. In an example, the instructions when executed by the processor causes the processor to implement the multi-cloud management platform in the cloud infrastructure. In an example, a plurality of items may be presented by the multi-cloud management platform, where each of the items represent a service offered by a cloud service provider hosting a cloud network managed by the multi-cloud management platform. In an example, each of the items may be one of a virtual machine (VM) image, a container image, a helm chart, a microservice image, a datastore, and a resource management template. Each item may have metadata associated with it. Metadata of the item is indicative of functional characteristics of a service represented by the item. Functional characteristics refers to types of functions of the service represented by the item. In an example, a service may have capabilities for configuring a database in a cloud network managed by the multi-cloud management platform. In the example, the service may be understood to be have functional characteristics of a database. Similarly, functional characteristics of different tools and templates may be included in the metadata of the item. In an example, the metadata includes one of a name of the service represented by the item, a version information of the service, a description of the service, a service provider information, and a combination thereof. In an example, the metadata of an item may be predefined by a cloud service provider providing the service represented by the item. The metadata may be provided in information tags provided by the service-provider. In an example, an item may have a name, a version information, and a description which may be tagged to item.

The instructions when executed by the processor 102 cause the processor 102 to analyze the metadata of an item. Analyzing the metadata of the item includes parsing the metadata and comparing the parsed metadata with predefined keywords stored in the memory 104. In an example, a keyword may be one of a phrase and a set of words. Further, the instructions when executed by the processor 102 cause the processor 102 to determine, based on the analysis, presence of a keyword, amongst a plurality of keywords, in the metadata of the item.

Further, the instructions when executed by the processor 102 cause the processor 102 to group the item in a category, amongst a plurality of categories based on the keyword and a predefined mapping. The predefined mapping is indicative of a correlation between the plurality of keywords and the plurality of categories. In an example, a set of keywords may be mapped to one category. The instructions when executed by the processor 102 further cause the processor 102 to generate a list of the plurality of categories. In an example, the plurality of categories includes databases, Continuous Integration/Continuous Delivery (CI/CD) tools, networking tools, Human Resource (HR) tools, and Information Technology (IT) support tools. Each of the plurality of items is grouped in a respective category amongst the plurality of categories. In an example, the list of items may be displayed in a Graphical User Interface (GUI) or Command Line Interface (CLI) of the multi-cloud management platform.

Once, the items are grouped in respective categories, the list of items presented to a cloud user may be curated under the categories. In an example, a curated list of items grouped under the categories may be provided to the cloud user as a service. Thus, items may be conveniently searched and accessed by a cloud user.

FIG. 2 illustrates a cloud infrastructure 200, according to an example. The cloud infrastructure includes a system 202. The system 202 hosts a multi-cloud management platform 204. The multi-cloud management platform 204 can manage and monitor cloud networks.

As shown in FIG. 2, the multi-cloud management platform 204 manages a first cloud network A, a second cloud network B, and a third cloud network C. The multi-cloud management platform 206 may collect data relating to the cloud networks A, B, and C, and store and analyze the data for cloud management. The cloud networks A, B, and C have cloud hosting capabilities. In an example, the first cloud network A, the second cloud network B, and the third cloud network C may be provided by different service providers. In an example, the cloud networks A, B, and C may be one of a public cloud and a private cloud, and a hybrid cloud.

The cloud service providers of the first, second and third cloud networks A, B, and C may provide different services for deployment, scaling and management of computing capabilities of the cloud networks A, B, and C. The services offered by the cloud service providers of the cloud networks A, B, and C may be provided to a cloud administrator through virtual appliances, tools, containers, microservices, templates, applications, or the like. These services may be represented as different items in a GUI provided by the multi-cloud management platform. Thus, an item may be representative of a corresponding service hosted by a cloud network, such as the cloud networks A, B, and C in a cloud infrastructure, such as the cloud infrastructure 200. In an example, each of the items may be one of a virtual machine (VM) image, a container image, a helm chart, a microservice image, a datastore, and a resource management template.

Consider that a first cloud service provider SP1 hosts the first cloud network A and the second cloud network B. The first cloud service provider SP1 offers resource management templates and microservice images. A second cloud service provider SP2 hosts the third cloud network C and provides applications for container orchestration, for example, Kubernetes Apps, and resource management templates.

Further, as shown in FIG. 2, the system 202 includes a processor 102 coupled to a memory 104. The processor 102 may be implemented as microprocessors, microcomputers, microcontrollers, digital signal processors, central processing units, state machines, logic circuitries, and any devices that manipulate signals based on operational instructions. Among other capabilities, the processor 102 is configured to fetch and execute computer-readable instructions stored in the memory 104. The computer-readable instructions, also referred to as instructions, includes instructions 206. The instructions 206 may include routines, programs, components, applications, data structures, and the like, which perform particular tasks or implement particular abstract data types. The instructions, being executable by the processor(s), may also be referred to as processor-executable instructions. The execution of the instructions to perform a function may be interchangeably referred to as the instructions causing performance of the function or the instructions enabling performance of the function.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and custom, may also be included.

The memory 104 may include any computer-readable medium known in the art including, for example, volatile memory (e.g., RAM), and/or non-volatile memory (e.g., EPROM, flash memory, etc.). The instruction(s) 206 include curation instruction(s) 208 which corresponds to instructions stored on a computer-readable medium and executable by a processor to enable grouping of the items in categories. The instruction(s) 206 also comprise other instruction(s) 210 that supplement applications on the system 202, for example, execution of functions of an operating system.

Data 212 serves, amongst other things, as a repository for storing data that may be fetched, processed, received, or generated by the instruction(s) 206. The data 212 includes item metadata 214 which stores functional information of the services represented by the items. The data 212 also comprises other data 216 that may be fetched, processed, received, or generated during execution of other instruction(s) 210. Although in FIG. 2, instructions 206 and data 212 are shown to be external to the multi-cloud management platform 204, in an example, the instructions 206 and the data 212 may reside within the multi-cloud management platform 204.

In operation, the curation instructions 208 when executed by the processor 102, cause the processor 102 to extract the metadata of the item from information tags provided by a service-provider of the service represented by the item. In an example, the metadata includes one of a name of the service represented by the item, a version information of the service, a description of the service, a service provider information, and a combination thereof.

In response to the metadata being extracted, the curation instructions 208 when executed the processor 102, cause the processor 102 to parse the metadata to obtain phrases or a set of words. In an example, the curation instructions 208 when executed by the processor 102 may cause the processor 102 to compare the parsed metadata with a plurality of keywords. In an example, the plurality of keywords may be stored in the memory 104. Thus, the metadata may be analyzed.

In response to determining presence of a keyword, amongst the plurality of keywords, in the metadata of the item, the curation instructions 208 when executed the processor 102, cause the processor 102 to identify a category corresponding to the keyword based on a predefined mapping. The predefined mapping is indicative of a correlation between the plurality of keywords and the plurality of categories.

In an example, the curation instructions 208 when executed by the processor 102, cause the processor 102 to categorize the item as databases, in response to determining that the keyword present in the metadata is one of database, DB, sql, nosql, datawarehouse, data caching, data store, and a combination thereof. In another example, the curation instructions 208 when executed the processor 102, cause the processor 102 to categorize the item as Continuous Integration/Continuous Delivery (CI/CD) tools, in response to determining that the keyword present in the metadata is one of Jenkins, pipeline, continuous integration, continuous delivery, gate job, and a combination thereof. In another example, the curation instructions 208 when executed the processor 102, cause the processor 102 to categorize the item as networking tools, in response to determining that the keyword present in the metadata is one of network, sdn, software defined networking, wireshark, networkport, Ethernet, network-interface, and a combination thereof. In another example, the curation instructions 208 when executed the processor 102, cause the processor 102 to categorize the item as Human Resource (HR) tools, in response to determining that the keyword present in the metadata is one of Human resource, workday, Human Resource Management System (HRMS), Human Resource Information System (HRIS), payroll, performance, evaluation, and a combination thereof. in another example, the curation instructions 208 when executed the processor 102, cause the processor 102 to categorize the item as Information Technology (IT) tools, in response to determining that the keyword present in the metadata is one of support, bootstrap, onboard, setup, sysadmin, software kit, and a combination thereof. Thus, the item is grouped in a category, based on the keyword and the predefined mapping. Grouping of an item in a category refers to tagging of the item for the particular category.

Figure 3:
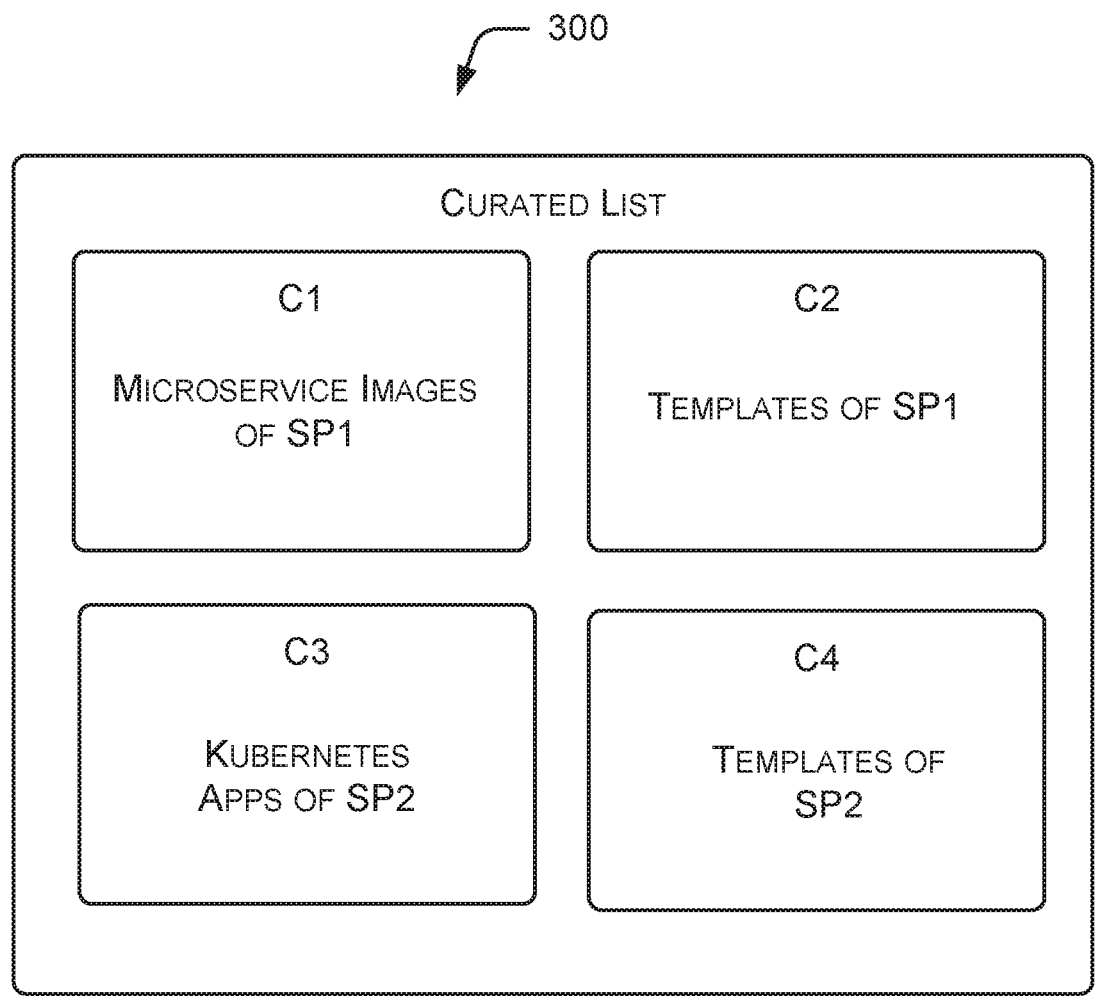
FIG. 3 illustrates a curated list of categories in which the items are grouped, according to an example.

Further, the curation instructions 208 when executed by the processor 102, cause the processor 102 to generate a list of the plurality of categories, where each of the plurality of items is grouped in a respective category amongst the plurality of categories. With reference to the services offered by the cloud service providers SP1 and SP2, a curated list 300 may be generated, as shown in FIG. 3. A curated list refers to a list of categories, where the items are organized under the respective categories. In the curated list 300, there are four categories, viz., C1, C2, C3, and C4. Microservice images offered by the cloud service provider SP1 is tagged under category C1. In an example, a brief description of the items grouped under the category C1 is also provided as "Microservice images of SP1". Similarly, resource management templates offered by the cloud service provider SP1 is tagged under category C2, kubernetes apps offered by the cloud service provider SP2 is tagged under category C3, and resource management templates offered by cloud service provider SP2 are tagged under category C4. In an example, the curated list 300 of items grouped under the categories may be provided to a cloud user as a service.

Figure 4:
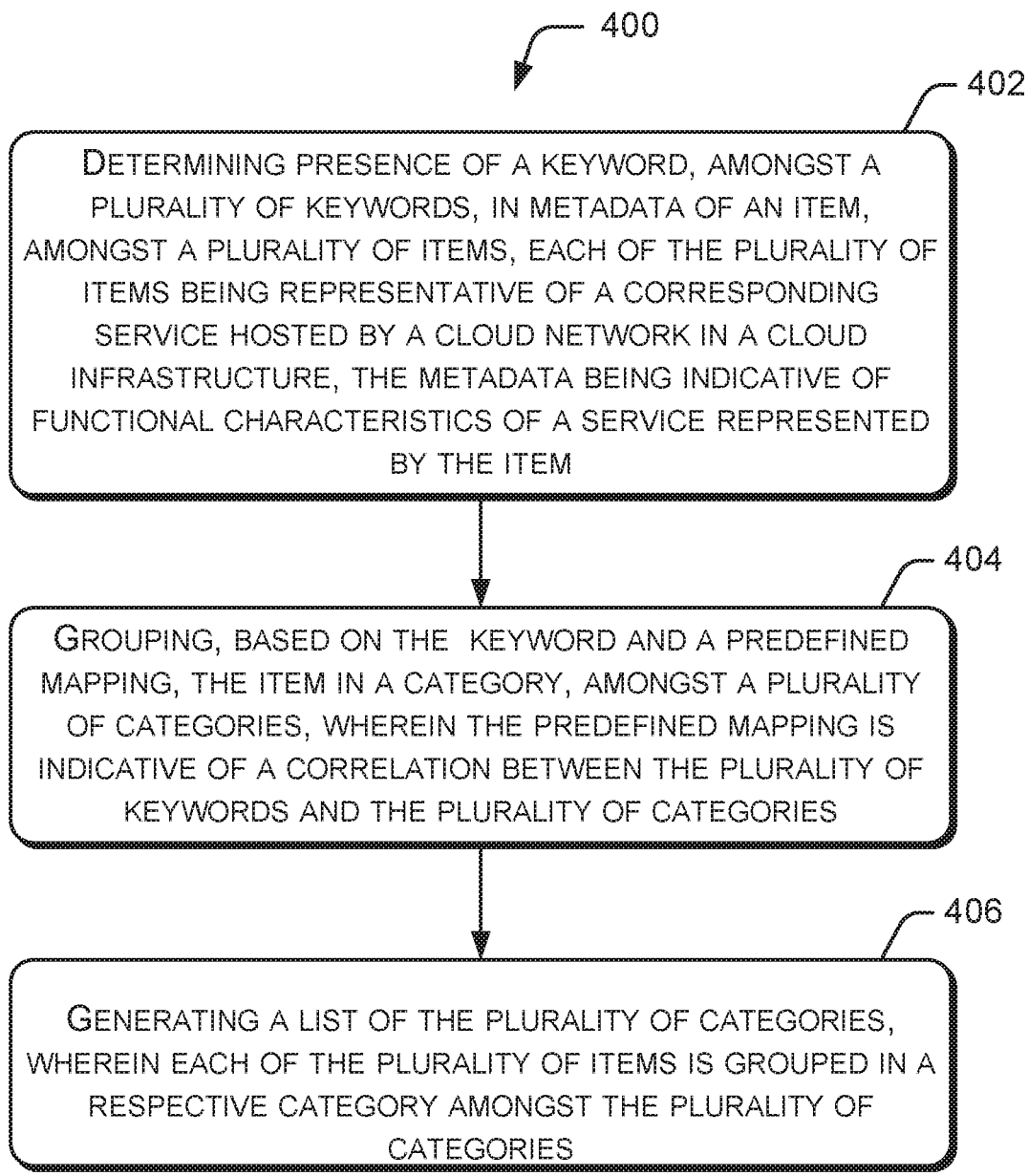
FIG. 4 illustrates a method for grouping items representative of cloud-based services into categories, according to an example.

FIG. 4 illustrates a method 400 for grouping items representative of cloud-based services into categories, according to an example. The method 400 enables grouping of items into categories, such as C1-C4, as shown in FIG. 3. The method 400 can be implemented by processing resource(s) or computing device(s) through any suitable hardware, a non-transitory machine readable medium, or combination thereof. In an example, step(s) of the method 400 may be performed by execution of computer-readable instructions, such as the curation instructions 208 which includes instructions stored on a medium and executable by a processing resource, such as the processor 102, of a system, such as the system 100 or 202. Further, although the method 400 is described in context of the aforementioned system 100 or 202, other suitable systems may be used for execution of the method 400. It may be understood that processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 4, at block 402, presence of a keyword, amongst a plurality of keywords, in metadata of an item is determined. The item is on of a plurality of items, where each of the items is representative of a corresponding service 'hosted by a cloud network, such as the cloud network A, B, or C in a cloud infrastructure, such as the cloud infrastructure 200. In an example, the metadata of the item may be extracted from information tags provided by a service-provider of the service represented by the item, prior to the determining presence of the keyword in the metadata.

In an example, each of the items may be one of a virtual machine (VM) image, a container image, a helm chart, a microservice image, a datastore, and a resource management template. Each item has metadata associated with it. Metadata of the item is indicative of functional characteristics of a service represented by the item. Functional characteristics refers to types of functions of the service represented by the item. In an example, a service may have capabilities for configuring a database in a cloud network managed by the multi-cloud management platform. In the example, the service may be understood to be have functional characteristics of a database. Similarly, functional characteristics of different tools and templates may be included in the metadata of the item. In an example, the metadata includes one of a name of the service represented by the item, a version information of the service, a description of the service, a service provider information, and a combination thereof. In an example, the metadata of an item may be predefined by a cloud service provider providing the service represented by the item.

At block 404, the item may be grouped in a category amongst a plurality of categories, based on the keyword and a predefined mapping. The predefined mapping is indicative of a correlation between the plurality of keywords and the plurality of categories. In an example, a set of keywords may be mapped to one category. In an example, the plurality of categories includes databases, Continuous Integration/Continuous Delivery (CI/CD) tools, networking tools, Human Resource (HR) tools, and Information Technology (IT) support tools. Each of the plurality of items is grouped in a respective category amongst the plurality of categories. In an example, the list of items may be displayed in a Graphical User Interface (GUI) or Command Line Interface (CLI) of the multi-cloud management platform.

In an example, in response to determining that the keyword present in the metadata is one of database, DB, sql, nosql, datawarehouse, data caching, data store, and a combination thereof, the item is categorized as databases. In response to determining that the keyword present in the metadata is one of Jenkins, pipeline, continuous integration, continuous delivery, gate job, and a combination thereof, the item is categorized the item as Continuous Integration/Continuous Delivery (CI/CD) tools. In response to determining that the keyword present in the metadata is one of network, sdn, software defined networking, wireshark, networkport, Ethernet, network-interface, and a combination thereof, the item is categorized as networking tools. In response to determining that the keyword present in the metadata is one of Human resource, workday, Human Resource Management System (HRMS), Human Resource Information System (HRIS), payroll, performance, evaluation, and a combination thereof, the item is categorized as Human Resource (HR) tools, At block 406, a list of the plurality of categories, such as the curated list 300, may be generated, where each of the plurality of items is grouped in a respective category amongst the plurality of categories. In an example, the curated list 300 of items grouped under the categories may be provided to a cloud user as a service.

Figure 5:
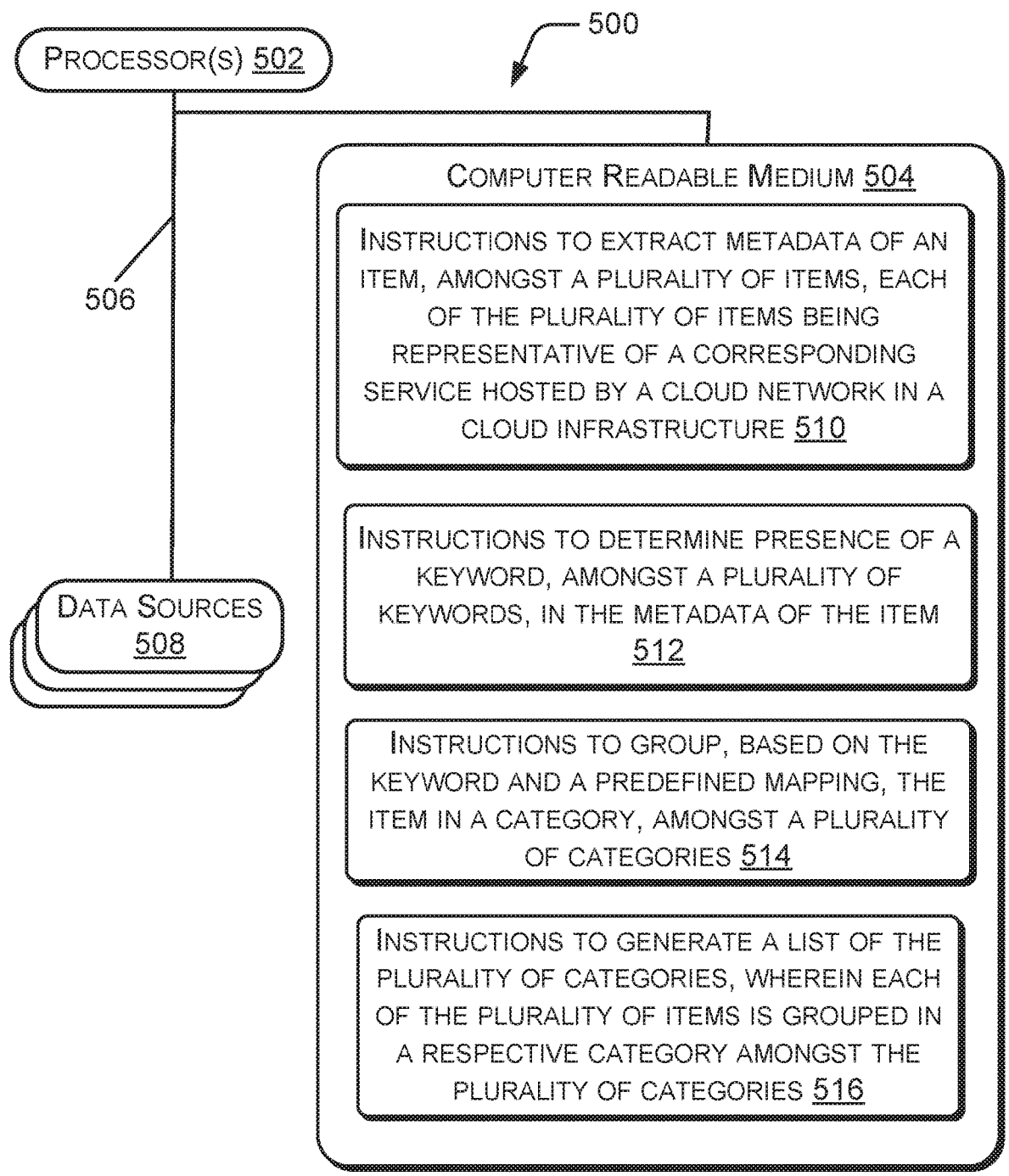
FIG. 5 illustrates a system environment implementing a non-transitory computer readable medium for grouping items representative of cloud-based services into categories, according to an example.

FIG. 5 illustrates a system environment 500 implementing a non-transitory computer readable medium for grouping items representative of cloud-based services into categories, according to an example.

In an example, the system environment 500 includes processor(s) 502 communicatively coupled to a non-transitory computer readable medium 504 through a communication link 506. In an example, the system environment 500 may be a computing system, such as the system 100 or 202. In an example, the processor(s) 502 may have one or more processing resources for fetching and executing computer-readable instructions from the non-transitory computer readable medium 504.

The non-transitory computer readable medium 504 can be, for example, an internal memory device or an external memory device. In an example implementation, the communication link 506 may be a direct communication link, such as any memory read/write interface.

The processor(s) 502 and the non-transitory computer readable medium 504 may also be communicatively coupled to data sources 508 over the network. The data sources 508 can include, for example, memory of the system, such as the system 100 or 202.

In an example implementation, the non-transitory computer readable medium 504 includes a set of computer readable instructions which can be accessed by the processor(s) 502 through the communication link 506 and subsequently executed to perform acts for grouping items representative of cloud-based services into categories, such as C1, C2, C3, and C4.

Referring to FIG. 5, in an example, the non-transitory computer readable medium 504 includes instructions 510 that cause the processor(s) 502 to extract metadata of an item, amongst a plurality of items. Each of the plurality of items is representative of a corresponding service hosted by a cloud network in a cloud infrastructure. The metadata is indicative of functional characteristics of a service represented by the item. In an example, the metadata is extracted from information tags provided by a service-provider of the service. In an example, the metadata includes one of a name of the service represented by the item, a version information of the service, a description of the service, a service provider information, and a combination thereof.

The non-transitory computer readable medium 504 includes instructions 512 that cause the processor(s) 502 to determine presence of a keyword, amongst a plurality of keywords, in the metadata of the item. The non-transitory computer readable medium 504 includes instructions 514 that cause the processor(s) 502 to group, based on the keyword and a predefined mapping, the item in a category, amongst a plurality of categories. The predefined mapping is indicative of a correlation between the plurality of keywords and the plurality of categories. In an example, the plurality of categories includes databases, Continuous Integration/Continuous Delivery (CI/CD) tools, networking tools, Human Resource (HR) tools, and Information Technology (IT) support tools. Further, the non-transitory computer readable medium 504 includes instructions 516 that cause the processor(s) 502 to generate a list, such as the curated list 300, of the plurality of categories, where each of the plurality of items is grouped in a respective category amongst the plurality of categories.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method comprising:
    analyzing, by a processor-based system, metadata corresponding to a plurality of cloud items for presence of keywords, each of the plurality of cloud items corresponding to a service provided in a cloud infrastructure, the metadata being indicative of functional characteristics of a service represented by the corresponding cloud item, wherein the services perform functions related to cloud orchestration, deployment, scaling or management of computing resources in the cloud infrastructure;
    grouping, based on the metadata keyword analysis and a predefined keyword mapping, the cloud items in a category, amongst a plurality of categories, wherein the predefined mapping is indicative of a correlation between the plurality of keywords and the plurality of categories, wherein the plurality of categories correspond to functions provided by the services;
    generating a categorized curated list of the cloud items grouped in respective categories based on the grouping of the services; and
    providing the categorized curated list for presentation to at least one cloud user to allow selection of a cloud item to access the corresponding service.

2. The method as claimed in claim 1, further comprising:
    extracting the metadata of the item from information tags provided by a service-provider of the service represented by the item.

3. The method as claimed in claim 1, wherein the metadata includes one of a name of the service represented by the item, a version information of the service, a description of the service, a service provider information, and a combination thereof.

4. The method as claimed in claim 1, wherein the plurality of categories includes databases, Continuous Integration/Continuous Delivery (CI/CD) tools, networking tools, Human Resource (HR) tools, and Information Technology (IT) support tools.

5. The method as claimed in claim 4, wherein the grouping comprises:
    categorizing the item as databases, in response to determining that the keyword present in the metadata is one of database, DB, sql, nosql, datawarehouse, data caching, data store, and a combination thereof.

6. The method as claimed in claim 4, wherein the grouping comprises:
    categorizing the item as CI/CD tools, in response to determining that the keyword present in the metadata is one of Jenkins, pipeline, continuous integration, continuous delivery, gate job, and a combination thereof.

7. The method as claimed in claim 4, wherein the grouping comprises:
    categorizing the item as networking tools, in response to determining that the keyword present in the metadata is one of network, sdn, software defined networking, wireshark, networkport, Ethernet, network-interface, and a combination thereof.

8. The method as claimed in claim 4, wherein the grouping comprises:
    categorizing the item as Human Resource (HR) tools, in response to determining that the keyword present in the metadata is one of Human resource, workday, Human Resource Management System (HRMS), Human Resource Information System (HRIS), payroll, performance, evaluation, and a combination thereof.

9. The method as claimed in claim 4, wherein the grouping comprises:
    categorizing the item as Information Technology (IT) tools, in response to determining that the keyword present in the metadata is one of support, bootstrap, onboard, setup, sysadmin, software kit, and a combination thereof.

10. The method as claimed in claim 1, wherein each of the plurality of items is one of a virtual machine (VM) image, a container image, a helm chart, a microservice image, a datastore, and a resource management template.

11. The method as claimed in claim 1, wherein the cloud infrastructure is a hybrid cloud infrastructure.

12. The method as claimed in claim 1, wherein the cloud network is amongst a plurality of cloud networks managed by a multi-cloud management platform in the cloud infrastructure.

13. A system comprising:
    a processor; and
    a memory coupled to the processor, the memory storing instructions executable by the processor to:
    analyze metadata corresponding to a plurality of cloud items for presence of keywords, each of the plurality of cloud items corresponding to a service provided in a cloud infrastructure, the metadata being indicative of functional characteristics of a service represented by the corresponding cloud item, wherein the services perform functions related to cloud orchestration, deployment, scaling or management of computing resources in the cloud infrastructure;
    group, based on the metadata keyword analysis and a predefined keyword mapping, the cloud items in a category, amongst a plurality of categories, wherein the predefined mapping is indicative of a correlation between the plurality of keywords and the plurality of categories, wherein the plurality of categories correspond to functions provided by the services;

generate a categorized curated list of the cloud items grouped in respective categories based on the grouping of the services; and provide the categorized curated list for presentation to at least one cloud user to allow selection of a cloud item to access the corresponding service.

14. The system as claimed in claim 13, wherein the processor is further to:

extract the metadata of the item from information tags provided by a service-provider of the service represented by the item.

15. The system as claimed in claim 13, wherein the metadata includes one of a name of the service represented by the item, a version information of the service, a description of the service, a service provider information, and a combination thereof.

16. The system as claimed in claim 13, wherein the plurality of categories includes databases, Continuous Integration/Continuous Delivery (CI/CD) tools, networking tools, Human Resource (HR) tools, and Information Technology (IT) support tools.

17. The system as claimed in claim 13, wherein each of the plurality of items is one of a virtual machine (VM) image, a container image, a helm chart, a microservice image, a datastore, and a resource management template.

18. A non-transitory computer-readable medium comprising computer-readable instructions, the computer-readable instructions when executed by a processor, cause the processor to:

extract metadata of a cloud item, amongst a plurality of cloud items, each of the plurality of cloud items being representative of a corresponding service hosted by a cloud network in a cloud infrastructure, the metadata being indicative of functional characteristics of a service represented by the cloud item, the metadata being extracted from information tags provided by a service-provider of the service, wherein the services perform functions related to cloud orchestration, deployment, scaling or management of computing resources in the cloud infrastructure;

determine presence of a keyword, amongst a plurality of keywords, in the metadata of the cloud item;

group, based on the metadata keyword determination and a predefined keyword mapping, the cloud items in a category, amongst a plurality of categories, wherein the predefined mapping is indicative of a correlation between the plurality of keywords and the plurality of categories, wherein the plurality of categories correspond to functions provided by the services;

generate a categorized curated list of the cloud items grouped in respective categories based on the grouping of the services; and provide the categorized curated list for presentation to at least one cloud user to allow selection of a cloud item to access the corresponding service.

19. The non-transitory computer-readable medium as claimed in claim 18, wherein the metadata includes one of a name of the service represented by the item, a version information of the service, a description of the service, a service provider information, and a combination thereof.

20. The non-transitory computer-readable medium as claimed in claim 18, wherein the plurality of categories includes databases, Continuous Integration/Continuous Delivery (CI/CD) tools, networking tools, Human Resource (HR) tools, and Information Technology (IT) support tools.

* * * * *